United States Patent
Tsukihashi et al.

(10) Patent No.: US 6,560,180 B1
(45) Date of Patent: May 6, 2003

(54) DISK STORAGE DEVICE

(75) Inventors: Akira Tsukihashi, Ohra-gun (JP); Tsuyoshi Yamamoto, Ota (JP); Katsuki Hattori, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 403 days.

(21) Appl. No.: 09/706,086

(22) Filed: Nov. 3, 2000

(30) Foreign Application Priority Data

Nov. 5, 1999 (JP) .......................................... 11-315805

(51) Int. Cl.$^7$ ................................................ G11B 7/00
(52) U.S. Cl. ................................ 369/53.31; 369/47.34; 369/59.24
(58) Field of Search ........................... 369/53.24, 53.31, 369/53.34, 47.22, 59.23, 59.24, 47.33, 47.34; 386/109, 111, 112, 123

(56) References Cited

U.S. PATENT DOCUMENTS

| | | | | |
|---|---|---|---|---|
| 4,931,927 A | * | 6/1990 | Ishiwata et al. | 369/53.22 |
| 5,563,862 A | * | 10/1996 | Udagawa | 369/53.24 |
| 5,587,978 A | * | 12/1996 | Endo et al. | 369/47.16 |
| 5,710,859 A | * | 1/1998 | Takeuchi et al. | 386/111 |
| 5,815,472 A | * | 9/1998 | Kuroda et al. | 369/47.33 |
| 6,198,707 B1 | * | 3/2001 | Yamamoto | 369/47.25 |
| 6,266,308 B1 | * | 7/2001 | Andoh | 369/53.24 |

* cited by examiner

*Primary Examiner*—Thang V. Tran
(74) *Attorney, Agent, or Firm*—Hogan & Hartson, LLP

(57) ABSTRACT

When a record decision unit 22 judges that recording has been interrupted, the recording data in a predetermined frame is ended. Data are continuously recorded onto a disk until the frame synchronous signal duration following the predetermined frame. Thereafter, the control output generated from the head output controller 14 is controlled to interrupt the recording operation. When the record decision unit 22 judges the resuming of recording, the control output from the head output controller 14 is controlled to resume the recording operation onto the disk from the frame synchronous signal duration in which the recording of data onto the disk has been interrupted.

3 Claims, 2 Drawing Sheets

DISK STORAGE DEVICE

BACKGROUND OF THE INVENTION

1. Field of the Invention

The present invention relates to a disk storage device for storing digital recording data on a disk using an optical beam emitted from an optical head. Particularly, the present invention relates to a disk storage device that can write additional data onto a disk while maintaining continuity of recording data.

2. Description of Related Art

CD-R (Compact Disk-Recordable) drives or CD-RW (Compact Disk-ReWritable) drives of the CD (Compact Disk) family are well known disk storage systems for recording digital data onto a disk using an optical beam emitted from an optical head.

During recording of CD-R and CD-RW disks, the recording device may stop the recording operation when a buffer under-run error occurs because of recording speed or data stream conditions which interrupt creation of data to be stored onto a disk.

Upon a halt of the recording operation, a single use disk such as a CD-R disk becomes unusable.

In the case of an rewritable disk such as a CD-RW disk, when a recording operation is ceased, all data must be rerecorded from the beginning. Here, there is the problem in that the re-procedure is troublesome and a waste time occurs.

There is known a packet write system in which data is recorded in packet units. However, because this packet write system is not necessarily supported by the CD-ROM, it is desirable to record data one track at a time or one session at a time, in terms of compatibility with CD systems.

The packet write system requires forming seven joint blocks for connection between packets. Hence, there is the problem in that the recording capacity of a disk is wasted.

For that reason, if recording data can be continuously and seamlessly added to data already recorded on a disk prior to halt of recording, track-at-a-time or the session-at-a-time systems are preferable because of increased compatibility with CD-ROM drivers. Moreover, in terms of an effective use of the recording capacity of a disk, a recording system such as the packet write system that requires joint blocks is disadvantageous because of the additional writing required. Hence, there has long been demand for disk recording devices that can additionally write continuously and without any joint blocks.

When additional data are written continuously as described above, it is necessary that the beginning of additional data to be recorded be seamlessly connected to the end of the data already recorded. However, it has been difficult to seamlessly and continuously connect sets of data.

When an optical head directs a laser onto a disk to record data onto the disk, it is difficult to accurately match the position where data recording on the disk starts with the end of data already recorded. This results from the time between the time an instruction for an additional writing operation is issued and the time the strength of the laser reaches a level necessary for recording. Moreover, it is difficult to accurately terminate at a break of recorded data at the time of ceasing a recording operation. Further, there will often be differences between the level when recording was halted and the level when recording is resumed. Therefore, merely joining the end of recorded data with the beginning of additional data to be written is unsatisfactory.

SUMMARY OF THE INVENTION

This invention is made to overcome the above-described problems. It is an object of the present invention to provide a disk storage device that can continuously execute additional writing in such a way that the beginning of recording data to be additionally written is substantially and seamlessly joined with the end of data already recorded.

According to the present invention, when the record decision unit judges that there has been an interruption of recording, recording data in a predetermined frame is terminated. After data is continuously recorded onto a disk until the duration of a frame synchronous signal following the predetermined frame, the control output generated from the head output control circuit is controlled to cease the recording operation. Meanwhile, when the record decision unit judges the start of recording, the control output generated from the head output control circuit is controlled to initiate recording onto the disk from the frame synchronous signal duration for which recording data onto the disk is ceased. Thus, when recording data is additionally written onto the disk used when a halt of recording occurs, in continuous with the recorded data, the joint portion between the end of the recorded data and the beginning of the recording data for additional writing acts as a frame synchronous signal duration. This facilitates management of data for which recording is stopped or started. Moreover, since the recorded data are jointed at the predetermined data structure portion, it is very unlikely that the seam caused by the additional writing will adversely affect data retrieval or use.

BRIEF DESCRIPTION OF THE DRAWINGS

These and other objects, features, and advantages of the present invention will become more apparent upon a reading of the following detailed description referring to the accompanying drawings, in which.

DESCRIPTION OF THE PREFERRED EMBODIMENT

Figure 1:
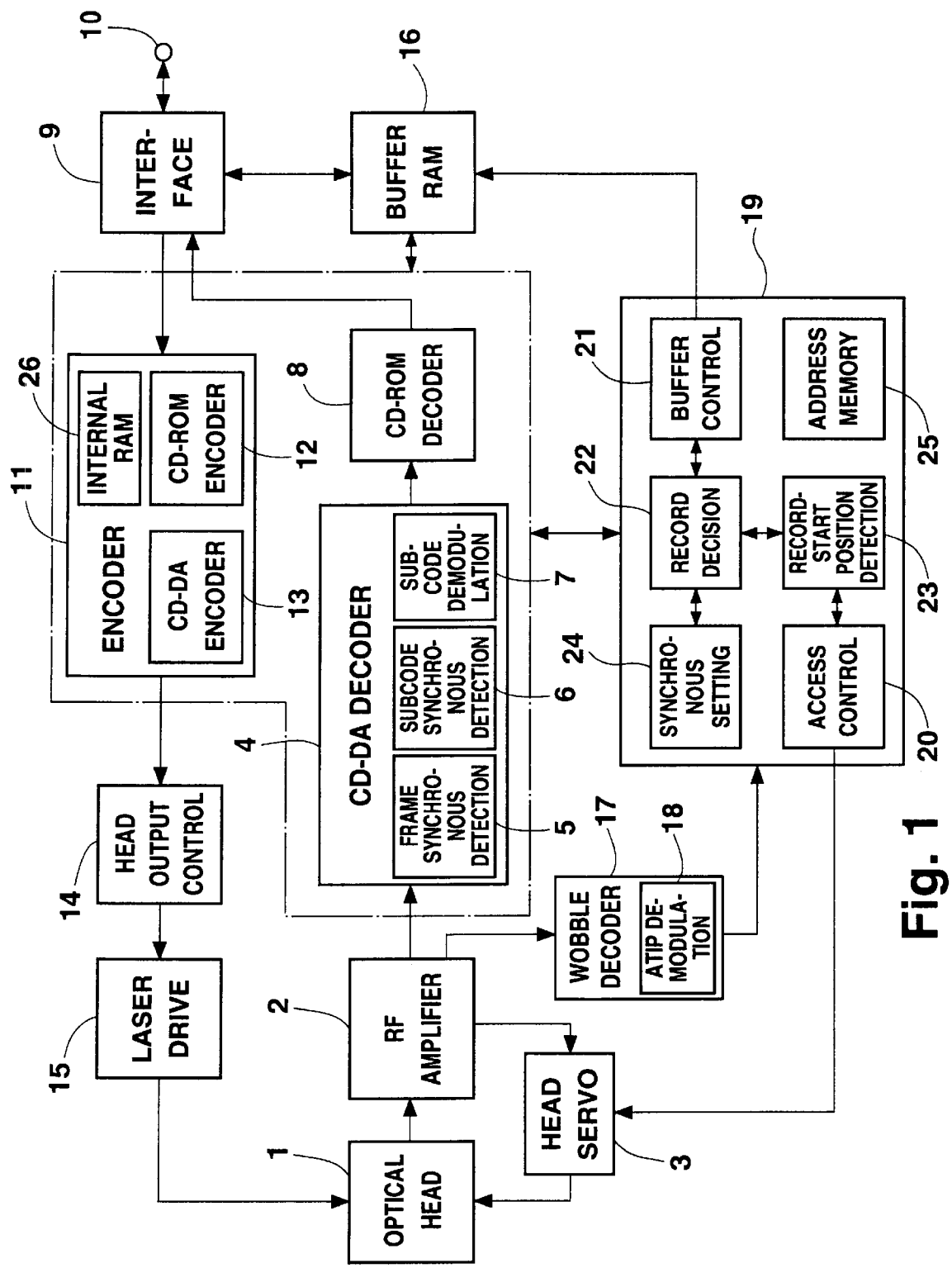
FIG. 1 is a circuit block diagram illustrating a CD-R driver being a disk storage device according to an embodiment of the present invention.

FIG. 1 is a circuit block diagram illustrating a CD-R drive being a disk recording device according to a preferred embodiment of the present invention.

Referring to FIG. 1, an optical head 1 focuses a laser tracing signal tracks of a disk to write recording data onto the disk and to read recording data from of the disk.

An RF amplifier 2 amplifies an RF signal (radio frequency signal) contained in an optical output received by the optical head 1 and converts it into two valued signals. A head servo circuit 3 feeds back various optical outputs obtained by the optical head 1. The head servo circuit 3 performs a focusing control for focusing the laser onto the signal surface of a disk and performs a tracking control of tracking the laser along the signal tracks of the disk. The head servo circuit 3 also performs a thread feeding control of feeding the optical head 1 in the direction of the diameter of the disk.

A CD-DA decoder 4 decodes two valued data of an RF signal output from the RF amplifier 2 over a range specified in the signal format of an audio-only CD-DA disk in synchronous with bit clock pulses. The CD-DA decoder 4 separates various data from the two valued data of the RF signal and then EFM decodes EFM (Eight to Fourteen Modulation) data. A frame synchronous detection unit 5 detects a frame synchronous signal representing the leading of a (EFM) frame of the EFM data. A subcode synchronous detection unit 6 detects a synchronous signal (S0, S1) in a subcode configured of 98 EFM frames. A sub-code decoder 7 decodes the subcode.

A CD-ROM decoder 8 decodes data decoded by the CD-DA decoder 4 over the range specified in the signal format of a CD-ROM disk. The CD-ROM decoder 8 synchronously detects CD-ROM data specified in the signal format of the CD-ROM disk and executes error detection and error correction according to an EDC (Error Detection Code) and an ECC (Error Correction Code) for the CD-ROM disk.

An interface 9 controllably exchanges data with host equipment, e.g. personal computers, externally connected via the connection terminal 10. An encoder 11 modulates data input to the interface 9 into data to be recorded onto a disk. The encoder 11 includes a CD-ROM encoder 12 and a CD-ROM encoder 13. The CD-ROM encoder 12 adds an error detection code EDC and an error correction code ECC for sync, header, and CD-ROM data to input data based on the CD-ROM standard. The CD-DA encoder 13 processes a process regarding an error correction code CIRC (Cross Interleaved Reed-Solomon Code) in a CD-DA system to CD-ROM data standard encoded by the CD-ROM encoder 12, based on the CD-DA standard. Thus, the CD-ROM encoder 13 adds the processed code to a subcode and then subjects the resultant data to an EFM process and then adds the processed data to a frame synchronous signal.

A head output control circuit 14 generates the control output to control the laser emitted from the optical head 1, based on recorded data regarding EFM data output from the encoder 11. A laser drive circuit 15 drives the laser source of the optical head 1 to record data onto a disk according to the control output from the head output control circuit 14. The laser drive circuit 15 sets the luminous output of the laser source in the optical head 1 to a recording level suitable for recording data onto a disk in a recording mode. The laser drive circuit 15 records a "1" level signal configuring recorded data onto the disk, with the laser source of the optical head 1 being emitted with the laser drive circuit 15. Moreover, the laser drive circuit 15 records a "0" level signal configuring recorded data onto the disk, with the light emission of the laser source of the optical head 1 being interrupted.

A buffer RAM 16 is used to cache data input through the interface 9 and to modulate data to be recorded onto the disk by means of the encoder 11. The buffer RAM 16 also is used to cache data read out of the disk and to demodulate the data by means of the CD-ROM decoder 8.

A wobble decoder 17 extracts a wobble component of 22.05 kHz from a pre-groove signal of a disk obtained via the RF amplifier 2 to create a component necessary for the rotational control of the disk. The wobble decoder 17 includes an ATIP demodulator 18 that demodulates ATIP (Absolute Time In Pre-groove) from the wobble component.

A system control circuit 19 performs system control related to the recording and reproduction of a disk. The system control circuit 19 includes an access controller 20, a buffer controller 21, a record decision unit 21, a record-start-position detection unit 23 and a synchronous setting unit 24. The access controller 20 controls an access operation by selectively referring to a subcode address of absolute time information in a subcode (sub Q code) demodulated with the subcode demodulation circuit 7 and an ATIP address of absolute time information in ATIP demodulated with the ATIP demodulation circuit 18. The buffer controller 21 controls the data writing to, and the data reading out of, the buffer RAM 16. According to either the data storage capacity of the buffer RAM 16 by the buffer control unit 21 or a command from host equipment connected to the connection terminal 10, the record decision unit 22 determines a halt or start of recording data onto the disk. The record-start-position detection unit 23 detects, as a record-start position of a disk, the position at which the end of data recorded on a disk in an intermission mode due to an interruption continues when the record decision unit 22 determines starting of a recording operation. The synchronous setting unit 24 synchronizes data to be newly recorded onto a disk with data already recorded onto the disk, using a subcode synchronous signal detected by the subcode synchronous detection circuit 6 and sub-Q data demodulated by the subcode demodulation circuit 7.

In the disk storage device with the above-mentioned configuration, when host equipment connected to the connection terminal 10 transmits data wanting recording, the interface 9 receives the data to write it to the buffer RAM 16.

The interface 9 receives data in block units. When the storage amount of data written in the buffer RAM 16 reaches a data capacity at which the encoder 11 starts an encoding process, data is read out of the buffer RAM 16. Thus, the encoder 11 modulates the data into recording data (EFM data) in a mode to be recorded onto a disk in EFM frame units.

When the position to be traced with the main beam from the optical head 1 comes to the writing position of the disk, the encoder 11 sequentially outputs sets of recorded data in EFM frame units. The address data of ATIP address to be demodulated by the ATIP demodulation circuit 18, corresponding to the recorded data output, is sequentially updated and then stored into the address memory 25 within the system control circuit 19.

The laser drive circuit 15 drives the laser source of the optical head 1 based on the recorded data output from the encoder 11 and records the recorded data onto the disk.

Next, the stopping and resuming of a data recording operation to a disk will be explained.

When the amount of data received by the interface 9 is under the capacity for data to be recorded onto the disk and the average data transfer rate of data input to the encoder 11 is slower than the average transfer rate of the recorded data output from the encoder 11, the amount of data stored in the buffer RAM 16 decreases.

When such a state continues, the amount of data stored in the buffer RAM 16 decreases. When this amount falls to a predetermined value, the record decision unit 22 judges that the buffer RAM 16 is in a buffer under-run state and then determines to cease the recording operation.

When a command from the host equipment connected to the connection terminal 10 instructs halting of the recording operation, the record decision unit 22 determines to cease recording.

When this occurs, the encoder 11 stops output operation while the head output control circuit 14 stops outputting a control output which controls the laser drive circuit 15. Thus, the optical head 1 halts emission of a recording laser. Finally, recording onto the disk is suspended. At this time, the encoder 11 does not create a joint block (run-out) to connect sets of recorded data. The data recording onto a disk is ceased without recording the joint block.

The encoding is stopped or started for each subcode frame which consists of 98 EFM frames. When the record decision unit 22 determines a cease of a data recording operation onto a disk, the encoder 11 continuously creates recorded data in each EFM frame configuring a subcode frame during an encoding process, using data stored in the internal RAM 26 within the encoder 11. Then, the encoder 11 creates recorded data in the last EFM frame to complete the subcode frame. Moreover, the encoder 11 creates a frame synchronous signal in the next coming EFM frame, thus ceasing the encoding process.

The head output control circuit 14 outputs a control output to the laser control circuit 15 according to the recording data from the encoder 11. When the encoder 11 stops the encoding process, the head output control circuit 14 ceases generation of the control output during the "0" level period of a frame synchronous signal last-generated from the encoder 11.

Figure 2:
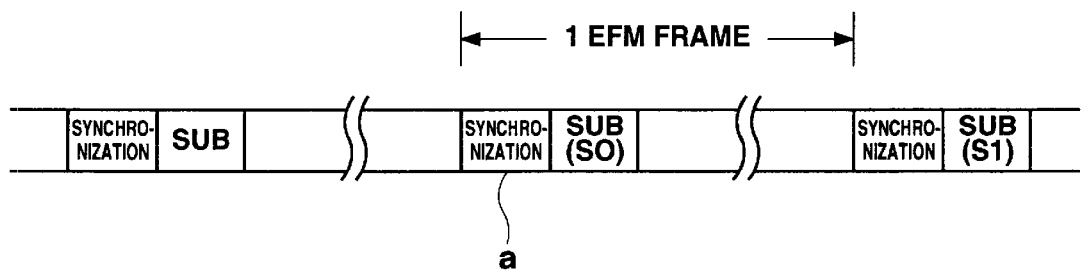
FIG. 2 is a diagram illustrating the configuration of recording data to explain the stop and the start of recording data onto a disk.

That is, when determining a cease of the recording operation onto a disk, the encoder 11 creates the frame synchronous signal (a) in the EFM frame to which the leading S0 of the subcode synchronous signal (SUB) is added, as shown in FIG. 2. The head output control circuit 14 stops generation of the control output during the "0" level period of the frame synchronous signal (a).

Figure 3:
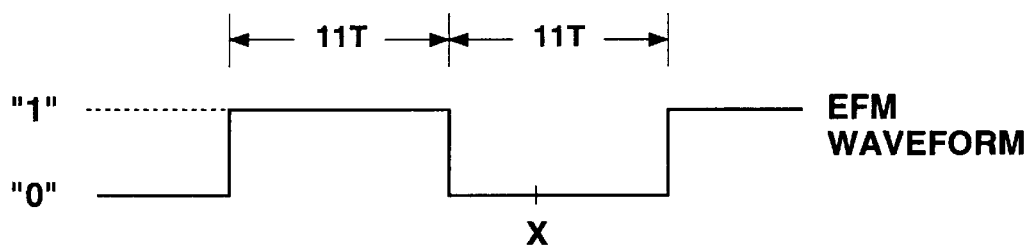
FIG. 3 is a diagram illustrating the EFM waveform of a frame synchronous signal to explain the stop and the start of recording data onto a disk.

The frame synchronous signal, as shown in FIG. 3, is configured of a combination of signals "1" and "0" in the maximum reversed period 11T eleven times the reference reversed period T of EFM data. The head output control circuit 14 ceases generation of the control output at a predetermined time x (an integral multiple of a reference reversed period T, preferably, a minimum reversed period 3T or more in terms of recording control) in the "0" level period of the maximum reversed period 11T.

In a combination of the "1" level frame synchronous signal 11T and the "0" level frame synchronous signal 11T, the former 11T may be "1" and the latter 11T may be "0". Instead, the former 11T may be "0" and the latter 11T may be "1". In either case, the head output control circuit 14 is controlled to cease generation of the control output during the "0" level period of the frame synchronous signal 11T.

The "0" level signal forming recording data is recorded onto a disk, with light emission of the laser source in the optical head 1 in a ceased state. Hence, a halt of recording data onto a disk means a halt period during which light emission of the laser source in the optical head 1 stops during the frame synchronous signal.

When a cease of recording data onto a disk results in cessation of the encoding process of the encoder 11, the storage amount of data received by the interface 9 and written into the buffer RAM 16 reaches the data capacity at which the encoder 11 starts its encoding process.

The record decision unit 22 determines execution of recording onto a disk and then makes the encoder 11 initiate an encoding process. The encoder 11 starts an encoding operation of data following the final data encoded immediately before a halt of recording.

When the encoder 11 starts its encoding operation, the interleave length of CIRC (108 frames at maximum in the EFM frame) is secured for data to be encoded immediately before a recording start time based on data stored in the internal RAM 26. If necessary, the encoding process is started using data stored in the internal RAM 26 immediately before a halt of recording.

When the data recording onto a disk is stopped, the laser drive circuit 15 drives the laser light source of the optical head 1 to set the luminous output of the optical head 1 to a reproduction level. At the time when the disk trace position of the optical head 1 reaches the ATIP address stored in the address memory 25, the optical head 1 enters a pause state wherein the optical head 1 returns one track jump. The optical head 1 hovers near data recorded immediately before recording was halted.

When the record decision unit 22 recognizes the beginning of recording, the record-start-position detection unit 23 detects the leading end of an unrecorded area continuous with the end of data recorded onto the disk before recording was halted.

In the detection of the leading edge of the unrecorded area by the record-start-position detection unit 23, the pause state is relieved according to a judgement on the beginning of the recording of the record decision unit 22. First, the optical head 1 refers to the Q-channel address of a subcode stored in the address memory 25 in a trace state and accesses one address back from the Q-channel address in the EFM frame. Thereafter, the EFM frame is counted by detecting a frame synchronous signal. The final EFM of a subcode frame corresponding to the Q-channel address is detected. When the frame synchronous signal in the final EFM frame is detected, the end position of data recorded onto a disk is detected by counting bit clock pulses.

When the leading end of an unrecorded area of a disk is accessed in a trace state upon detection, the CD-DA decoder 4 performs a decoding operation in synchronous with reproduced clock pulses reproduced based on the EFM data. Meanwhile, in cooperation with the synchronous setting unit 24, the encoder 11 performs an encoding operation in synchronous with the reproduced clock pulses. Thus, the recorded data created by the encoder 11 is synchronized with data recorded onto a disk.

When the leading end of the unrecorded area of a disk is detected, the operation clock of the encoder 11 is switched from a reproduction clock to a reference clock. The encoding operation of the encoder 11 is synchronized with reference clock pulses. The head output control circuit 14 produces its control output based on newly-recorded data following data recorded onto the disk in an output stand-by state of the encoder 11. Recording of the newly-recorded data starts from the leading end of the unrecorded area of the disk in synchronization with the recorded data.

Recording data that is newly-created by the encoder 11 at the recording start time of data onto a disk is formed of an EFM frame containing a "S0" signal. The "S0" signal represents the leading of a subcode synchronous signal in the subcode frame next to the subcode frame recorded by the time the data recording onto the disk is ceased. The head output control circuit 14 begins generating a control output based on the frame synchronous signal of the "0" level continued at the predetermined time X within the "0" level period of the frame synchronous signal in the EFM frame output from the encoder 11.

That is, the "0" level period of the frame synchronous signal recorded immediately after the start of recording data onto a disk is set by considering the "0" signal period of a frame synchronous signal recorded onto a disk immediately before the halt of recording. The sum of the "0" signal period recorded onto a disk immediately before the halt of recording and the "0" signal period recorded onto a disk immediately after the start of recording corresponds to the "0" signal period 11T of the frame synchronous signal.

For that reason, the connection of data recorded on a disk before the halting of recording and the recording data which is written onto the disk after the halt of recording is carried out during the "0" signal period of the frame synchronous signal. Because the "0" level signal is recorded onto a disk with the light emission of the laser source of the optical head 1 ceased, sets of recorded data can be seamlessly joined.

The frame synchronous signal is formed of the signal 11T having a maximum reversed period. Because the signal with the maximum reversed period is used to join recording data sets, a recording data error ratio in time axis, which may occur at the time of joining recording data sets, can be minimized.

Sets of recording data are connected within the period of the frame synchronous signal (a) (shown in FIG. 2) in the EFM frame, to which the leading "S0" of the subcode synchronous signal is attached. Recording data onto a disk is halted or begun in subcode frame units. The recording data can be managed with subcodes.

A CD-R drive was used as an example in the above embodiment. However, a CD-RW drive may also be employed in a manner similar to that of the example CD-R drive.

Where the CD-RW drive records data onto a disk, the output level of the laser emitted from the optical head 1 is set to two levels including a recording level and an erasure level, so that a "1" level signal and a "0" level signal are recorded. If sets of recording data in an additional writing mode after a halt of recording are joined within the "0" signal period of the frame synchronous signal, the connection is performed with an erasure output level of the laser emitted from the optical head 1. This erasure level is stable and easily controlled.

In the case of a CD-RW drive, because an overwrite system that can overwrite recording data onto a disk is employed, it is not required to form the "0" level signal period 11T of the frame synchronous signal by joining the period during which data is recorded onto a disk before the halt of recording to the period during which data is additionally written onto a disk after the halt of recording. With the "0" signal period 11T of the frame synchronous signal partially or wholly recorded onto a disk before the halt of recording, the "0" level signal period 11T of the frame synchronous signal is overwritten after the start of recording. Thus, the recording data to be additionally written after the halt of recording may be joined.

The present invention can also be employed to write to a disk newly-created recording data, seamlessly and continuously with data previously recorded onto the disk. Particularly, since recording data onto a disk is halted or started during a frame synchronous signal period, recording data subjected to a halt and start of recording can be easily managed. The recorded-data connected position corresponds to a data structure portion determined as a frame synchronous signal. Even if a joint is formed at the position where recording data sets are connected, the data structure portion greatly reduces the possibility of adverse effects due to the existence of the joint.

The operation of recording data onto a disk stops and starts during the period of the frame synchronous signal in a frame to which the leading of the subcode synchronous signal is attached. Hence, the address data of the subcode can be used to manage recording data for the halt and start of recording so that connection between recording data sets can be easily managed.

Moreover, the disk storage device of the present invention halts or starts recording data with the signal level recorded at the low output level of an light beam from the optical head used at the time of recording data. As a result, sets of recorded data can be better joined together.

What is claimed is:

1. A disk storage device, wherein recording data to which a frame synchronous signal is attached for every frame is recorded onto a disk using an optical beam emitted from an optical head, comprising:

an encoder for encoding each frame unit of recording data to be recorded onto the disk according to input data;

a record decision unit for deciding when to stop and start the recording of data onto the disk;

a record-start-position detection unit for detecting as a disk-record-start position a position which is adjacent to the end of data recorded onto the disk, when said record decision unit judges a start of recording data; and a head output controller for generating a control output, based on recording data output from said encoder, said control output controlling the optical beam emitted from said optical head to record data onto the disk, and for controlling generation of said control output according to a stop or start of recording judged by said record decision unit; wherein when said record decision unit judges a stop of recording, recording data in a predetermined frame is terminated and a control output generated from said head output control circuit is controlled to halt the recording operation after recording has been continuously made onto said disk until the duration of a frame synchronous signal following the predetermined frame; and when said record decision unit judges a start of recording, a control output generated from said head output controller is controlled to start the recording of data onto said disk from the frame synchronous signal duration in which recording data onto the disk has been halted.

2. The disk storage device defined in claim 1, wherein recording data is recorded onto the disk, said recording data being configured of subcodes, wherein said subcodes contain information about addresses of the disk and are dispersed over respective frames;

one subcode is arranged for a predetermined number of frames: and a stop or start of recording data onto said disk is performed in a frame synchronous signal duration of a frame to which the leading end of a subcode synchronous signal is attached.

3. The disk storage device defined in claim 1 or 2, wherein a stop or start of recording data is performed with a signal level among a "1" level signal and a "0" level signal forming said recording data, said signal level being recorded at a low output level of the optical beam emitted from said optical head and used at the time of data recording.

* * * * *